United States Patent [19]

Savarimuthu

[11] 4,044,862
[45] Aug. 30, 1977

[54] VEHICLE SUCTION BRAKE

[76] Inventor: Sundar Savarimuthu, 17 Gleneagle Crescent, Willowdale, Ontario, Canada

[21] Appl. No.: 716,998

[22] Filed: Aug. 24, 1976

[51] Int. Cl.² ............................................. B60T 1/14
[52] U.S. Cl. ........................................ 188/5; 180/115
[58] Field of Search ................................. 303/1, 2–3, 303/10–12, 18; 188/5, 8, 7, 2 R; 180/115, 1 R, 82 R

[56] References Cited
U.S. PATENT DOCUMENTS 3,062,327  11/1962  Debus ...................................... 188/5
3,116,897  1/1964   Theed .............................. 180/115 X
3,799,293  3/1974   Howells et al. ......................... 188/5

FOREIGN PATENT DOCUMENTS 409,078   1/1925  Germany ................................. 188/5
23,640    5/1907  United Kingdom ..................... 188/5

Primary Examiner—Trygve M. Blix
Assistant Examiner—Douglas C. Butler
Attorney, Agent, or Firm—Allen D. Brufsky

[57] ABSTRACT

An auxiliary brake system for a motor vehicle including a plurality of suction cups mounted on the chassis of the vehicle which are lowered into contact with a roadway during skids on icy or wet pavement.

5 Claims, 3 Drawing Figures

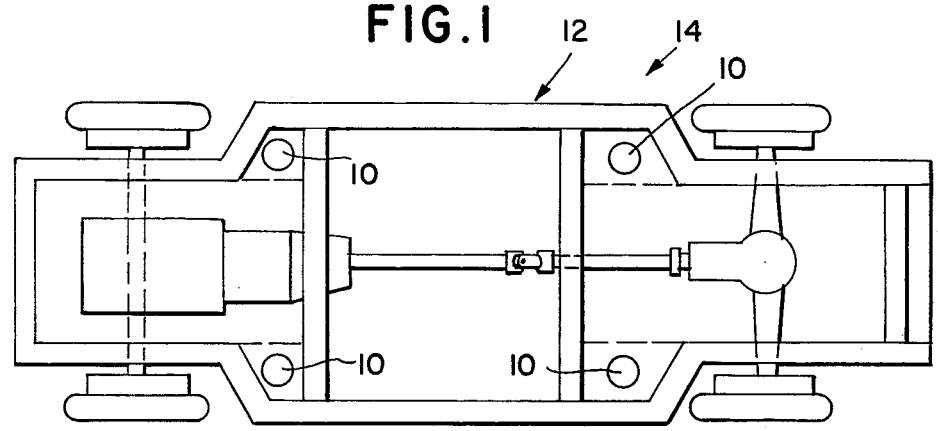
FIG.1
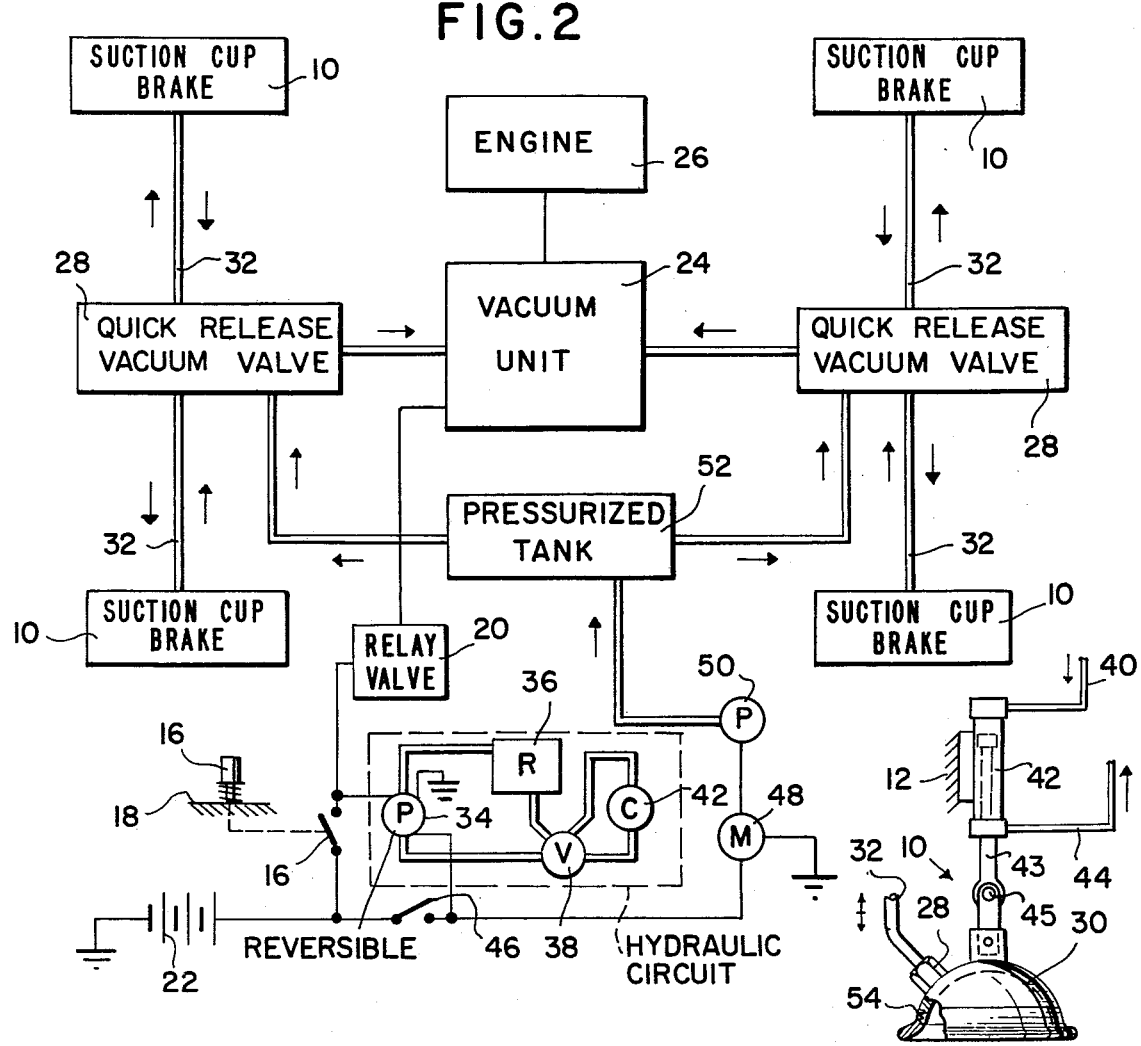
FIG.2
FIG.3

VEHICLE SUCTION BRAKE

BACKGROUND OF THE INVENTION

This invention relates to an auxiliary vehicle brake, and more particularly, a suction brake for use in an emergency.

It is well known that in certain instances, for example, when sliding on icy or slippery roads, a normal vehicle brake is not only ineffective but is even dangerous to apply. Accordingly, this invention provides an auxiliary brake for use in such emergencies.

SUMMARY OF THE INVENTION

In accordance with the invention, one or more hydraulically reciprocable suction cups are mounted on the chassis of a motor vehicle. When a foot switch on the floor of the vehicle is depressed, a relay valve couples a vacuum unit to the engine drive to evacuate the interior of the suction cups through a two-way valve connected to each cup. Simultaneously, a reversible motor is actuated to drive a pump in a hydraulic circuit to cause a hydraulic cylinder to lower the suction cups vertically to the pavement to brake the vehicle. When the foot switch is released the coupling of the engine to the vacuum unit is disengaged enabling a second switch mounted on the dashboard to be closed which energizes a motor to drive a pump to pump air from a pressurized tank to the interior of each suction cup through the two-way valve relieving the suction in the cup. The motor coupled to the hydraulic pump is again actuated simultaneouly to reverse the fluid flow in the hydraulic system to raise each of the suction cups to a stored position.

BRIEF DESCRIPTION OF THE DRAWING

Further objects and advantages of the invention will become apparent from the following description and claims and from the accompanying drawing, wherein:

FIG. 1 is a schematic bottom plan view of the chassis of a motor vehicle equipped with suction brakes in accordance with the present invention;

FIG. 2 is a schematic flow diagram of the vacuum and hydraulic circuits used to activate and release the suction brakes on the motor vehicle of FIG. 1; and FIG. 3 is a side view in elevation, partly in section of one of the suction brakes mounted on the vehicle chassis of FIG. 1.

DETAILED DESCRIPTION OF THE PREFERRED EMBODIMENT

Referring now to the drawing in detail, wherein like numerals indicate like elements throughout the several views, one or more hydraulically reciprocable suction cup brakes 10 are mounted on the chassis 12 of a motor vehicle 14.

As shown in the flow diagram of FIG. 2, when a foot switch 16 on the floor 18 of vehicle 14 is depressed, a relay or solenoid valve 20 connected in series with vehicle battery 22 couples a vacuum unit 24 to the engine output drive 26 of vehicle 14 to evacuate the interior of each suction cup brake 10 through a two-way quick release vacuum valve 28 connected to the suction cup 30 of each brake 10 through a line 32. Valve 28 is of the quick release type, i.e. it can instantaneously be opened or closed as desired. Vacuum unit 24 can typically be a pump or blower which draws air from the interior or each cup 30.

Simultaneously, a reversible electric motor (not shown) is electrically actuated to drive a reversible pump 34, e.g. of the centrifugal type, to deliver hydraulic fluid from a reservoir 36 through a two-way valve 38 to the inlet line 40 of a hydraulic cylinder 42 whose piston 43 is connected to suction cup 30 by a pivotal joint 45. Fluid is forced from cylinder 42 through an outlet line 44 and valve 38 and returned to reservoir 36. Evacated suction cups 30 will contact the pavement to abruptly retard movement of vehicle 14 even on icy or slick roads.

When foot switch 16 is released, the coupling of vacuum unit 24 to the engine 26 is disengaged enabling a switch 46 mounted on the dashboard of vehicle 14 to be closed which energizes a motor 48 to drive a pump 50 to pump air from a pressurized tank 52 to the interior of each suction cup 30 through valve 28 in line 32, relieving the suction in each cup 30. The motor coupled to hydraulic pump 34 is again actuated simultaneously to reverse the fluid flow in the hydraulic system so that fluid enters each cylinder 42 through line 44 and egresses through line 42 to raise each suction cup 30 to a stored position.

As shown in FIG. 3 the bottom of each cup is threaded at 54 to the main body so it can be replaced due to wear.

I claim:

1. An auxiliary brake for a motor vehicle driven upon a roadway comprising:
   at least one suction cup normally stored on said vehicle;
   means on said vehicle for lowering and raising said suction cup, said raising and lowering means including a fluid cylinder having a piston connected to said suction cup and a fluid circuit for driving said piston in said cylinder, said fluid circuit being selectively actuable;
   means on said vehicle for evacuating air from the interior of said suction cup thereby creating a vacuum between said suction cup and said roadway;
   means on said vehicle for supplying air to said interior of said suction cup to break the vacuum between said suction cup and said roadway;
   first switch means mounted on the floor of said vehicle for activating said evacuation means, said first switch means simultaneously activating said lowering and raising means to lower said piston; and
   second switch mounted on the dash of said vehicle for simultaneously actuating said supply means and for deactivating said raising and lowering means to raise said piston.

2. A brake in accordance with claim 1 wherein said suction cup includes a bottom portion threadedly engaged and removable from a body portion.

3. A brake in accordance with claim 1 wherein said supply means includes a source of pressurized air on said vehicle and valve means between said source and the interior of said suction cup, said first switch means opening said valve means and so as to permit communication between said source and the interior of said suction cup.

4. A brake in accordance with claim 1 wherein said evacuation means includes a vacuum unit and valve means between said vacuum unit and said suction cup, said second switch means opening said valve means so as to permit the communication between said vacuum unit and the interior of said suction cup.

5. A brake in accordance with claim 4 wherein said motor vehicle includes a motor providing an output drive, said vacuum unit being coupled to said output drive of said vehicle upon closing of said second switch means, said engine driving said vacuum unit.

* * * * *